United States Patent
Shapiro

(10) Patent No.: US 7,617,695 B2
(45) Date of Patent: Nov. 17, 2009

(54) CONTROL METHOD FOR VARIABLE CAPACITY COMPRESSORS

(75) Inventor: Doron Shapiro, St. Louis, MO (US)

(73) Assignee: Hussmann Corporation, Bridgeton, MO (US)

( * ) Notice: Subject to any disclaimer, the term of this patent is extended or adjusted under 35 U.S.C. 154(b) by 476 days.

(21) Appl. No.: 11/392,323

(22) Filed: Mar. 29, 2006

(65) Prior Publication Data

US 2007/0227167 A1    Oct. 4, 2007

(51) Int. Cl.
   *F25B 1/00*    (2006.01)
   *F25B 49/00*    (2006.01)
   *F25B 7/00*    (2006.01)

(52) U.S. Cl. .................. 62/228.5; 62/228.3; 62/175

(58) Field of Classification Search ............ 62/228.5, 62/228.3, 228.4, 175, 510
See application file for complete search history.

(56) References Cited

U.S. PATENT DOCUMENTS

| | | | |
|---|---|---|---|
| 3,513,662 A | 5/1970 | Golber | |
| 4,152,902 A | 5/1979 | Lush | |
| 4,535,602 A | 8/1985 | Alsenz et al. | |
| 4,951,475 A | 8/1990 | Alsenz | |
| 5,231,846 A | 8/1993 | Goshaw et al. | |
| 5,343,384 A * | 8/1994 | Fisher et al. | 700/4 |
| 6,186,743 B1 | 2/2001 | Romer | |
| 6,516,622 B1 * | 2/2003 | Wilson et al. | 62/228.3 |
| 6,751,971 B2 | 6/2004 | Kawaguchi et al. | |
| 6,772,607 B2 | 8/2004 | Tsuboe et al. | |

* cited by examiner

*Primary Examiner*—Chen-Wen Jiang
(74) *Attorney, Agent, or Firm*—Michael Best & Friedrich LLP

(57) ABSTRACT

A refrigeration system including a refrigeration circuit and a controller. The refrigeration circuit includes a plurality of variable capacity compressors arranged in parallel to compress a refrigerant. A second variable capacity compressor is started after a first variable capacity compressor. An evaporator defines a load while evaporating the refrigerant to refrigerate a space within a predetermined temperature range. The controller is programmed to control the operation of the plurality of variable capacity compressors to match the capacity of the plurality of variable capacity compressors to the load by increasing the capacity of the last compressor in the queue of running compressors when the capacity of the plurality of variable capacity compressors is lower than the load and by decreasing the capacity of the first compressor in the queue when the capacity of the plurality of variable capacity compressors is higher than the load.

16 Claims, 4 Drawing Sheets

CONTROL METHOD FOR VARIABLE CAPACITY COMPRESSORS

BACKGROUND

The present invention relates to a control system for variable capacity compressors, and more particularly to a method of controlling two or more variable capacity compressors arranged in parallel.

An existing method of controlling fixed capacity compressors in parallel systems is referred to as "Round-Robin" cycling. In "Round-Robin" cycling, the first compressor turned on as the system load increases is also the first compressor turned off as the system load decreases. For example, in a system including three compressors, a first compressor is turned on and runs at a fixed capacity when the load increases from zero. As the load continues to increase, the second compressor is turned on and runs at a fixed capacity followed by the third to reach the maximum capacity of the compressors. When the load begins to decrease with all three compressors running, the first compressor is initially stopped, and the second and third remain running at their respective fixed capacities. Continued decreases in the load will cause the second compressor to be turned off leaving the third as the last running compressor. Finally, the third compressor will be turned off due to further reduction in the load. This known method does not utilize variable capacity compressors, and therefore the incremental unit of adjustment of the capacity of the entire compressor bank is limited to the full fixed capacity of a single compressor.

Another existing method of controlling compressors in parallel systems includes a single variable capacity compressor in addition to the multiple fixed capacity compressors. In this method, the single variable capacity compressor is used in combination with the "Round-Robin" cycling to provide increased incremental control between activation and deactivation of the fixed capacity compressors thereby allowing the entire bank of compressors to more accurately match the load. For example, a variable capacity compressor could be used with the three-compressor "Round-Robin" system described above. In this system, rather than starting a new compressor when the load exceeds the capacity of the running compressors, the variable capacity compressor is adjusted to match the load. Likewise, rather than shutting down a compressor when the load is lower than the capacity of the running compressors (including the variable compressor) the capacity of the variable capacity compressor is decreased to match the load. Only when the capacity percentage of the variable capacity compressor falls outside of an acceptable capacity range is a new fixed capacity compressor started or a running fixed capacity compressor turned off. In this circumstance, the variable capacity compressor is then adjusted to compensate for the added or removed fixed capacity compressor to match the load.

SUMMARY

The present invention relates to refrigeration systems having compressors in parallel where the compressors have continuously variable capacity, such as variable piston stroke or variable speed. The control method of the present invention includes starting/stopping and loading/unloading compressors to match the cooling requirements of the system, such that over time, compressor loading and run times will be approximately evenly distributed across the compressors.

In one embodiment, the invention provides a refrigeration system including a refrigeration circuit and a controller. The refrigeration circuit includes a plurality of variable capacity compressors arranged in parallel, a condenser in fluid communication with the plurality of variable capacity compressors, and at least one evaporator in fluid communication between the condenser and the plurality of variable capacity compressors. The plurality of variable capacity compressors compress a refrigerant. A second variable capacity compressor is started after a first variable capacity compressor (e.g., after the first variable capacity compressor reaches full load). The first variable capacity compressor defines a first compressor in a queue of running compressors and the second variable capacity compressor defines a last compressor in the queue. The condenser receives compressed refrigerant from the plurality of variable capacity compressors and condenses the refrigerant. The evaporator receives condensed refrigerant from the condenser, defines a load while evaporating the refrigerant to refrigerate a space within a predetermined temperature range, and delivers the evaporated refrigerant to the plurality of variable capacity compressors. The controller is programmed to control the operation of the plurality of variable capacity compressors to match the capacity of the plurality of variable capacity compressors to the load by increasing the capacity of the last compressor in the queue when the capacity of the plurality of variable capacity compressors is lower than the load and by decreasing the capacity of the first compressor in the queue when the capacity of the plurality of variable capacity compressors is higher than the load.

In another embodiment, the invention provides a refrigeration system including a first variable capacity compressor that runs at a first percentage of maximum capacity and a second variable capacity compressor started after the first that runs at a second percentage of maximum capacity. The first variable capacity compressor defines a first compressor in a queue of running compressors and the second variable capacity compressor defines a last compressor in the queue. A controller controls the plurality of variable capacity compressors to match the capacity of the plurality of variable capacity compressors to a load defined by an evaporator. The controller shuts off the first compressor in the queue and increases the capacity of the last compressor in the queue when the sum of the first and second percentages is less than a predetermined level.

In another embodiment, the invention provides a method of controlling a refrigeration system. The method includes arranging a plurality of variable capacity compressors in parallel in a refrigeration circuit, starting a first of the plurality of variable capacity compressors to define a first compressor in a queue of running compressors, starting a second of the plurality of variable capacity compressors after starting the first compressor in the queue to define a last compressor in the queue, programming a predetermined temperature range desired for a space, operating at least one evaporator of the refrigeration system to refrigerate the space within the predetermined temperature range to define a load, matching the capacity of the plurality of variable capacity compressors to the load, increasing the capacity of the last compressor in the queue when the capacity of the plurality of variable capacity compressors is lower than the load, and decreasing the capacity of the first compressor in the queue when the capacity of the plurality of variable capacity compressors is higher than the load.

In yet another embodiment, the invention provides a method of controlling a refrigeration system. The method includes arranging a plurality of variable capacity compressors in parallel in a refrigeration circuit, starting a first of the plurality of variable capacity compressors to define a first compressor in a queue of running compressors, running the first compressor in the queue at a first percentage of maximum capacity, starting a second of the plurality of variable capacity compressors after starting the first compressor in the queue to define a last compressor in the queue, running the last compressor in the queue at a second percentage of maximum capacity, programming a predetermined temperature range desired for a space, operating at least one evaporator of the refrigeration system to refrigerate the space within the predetermined temperature range to define a load, matching the capacity of the plurality of variable capacity compressors to the load, calculating a sum by adding the first and second percentages, comparing the sum with a predetermined level, and shutting off the first compressor in the queue and increasing the capacity of the last compressor in the queue when the sum of the first and second percentages is less than a predetermined level.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
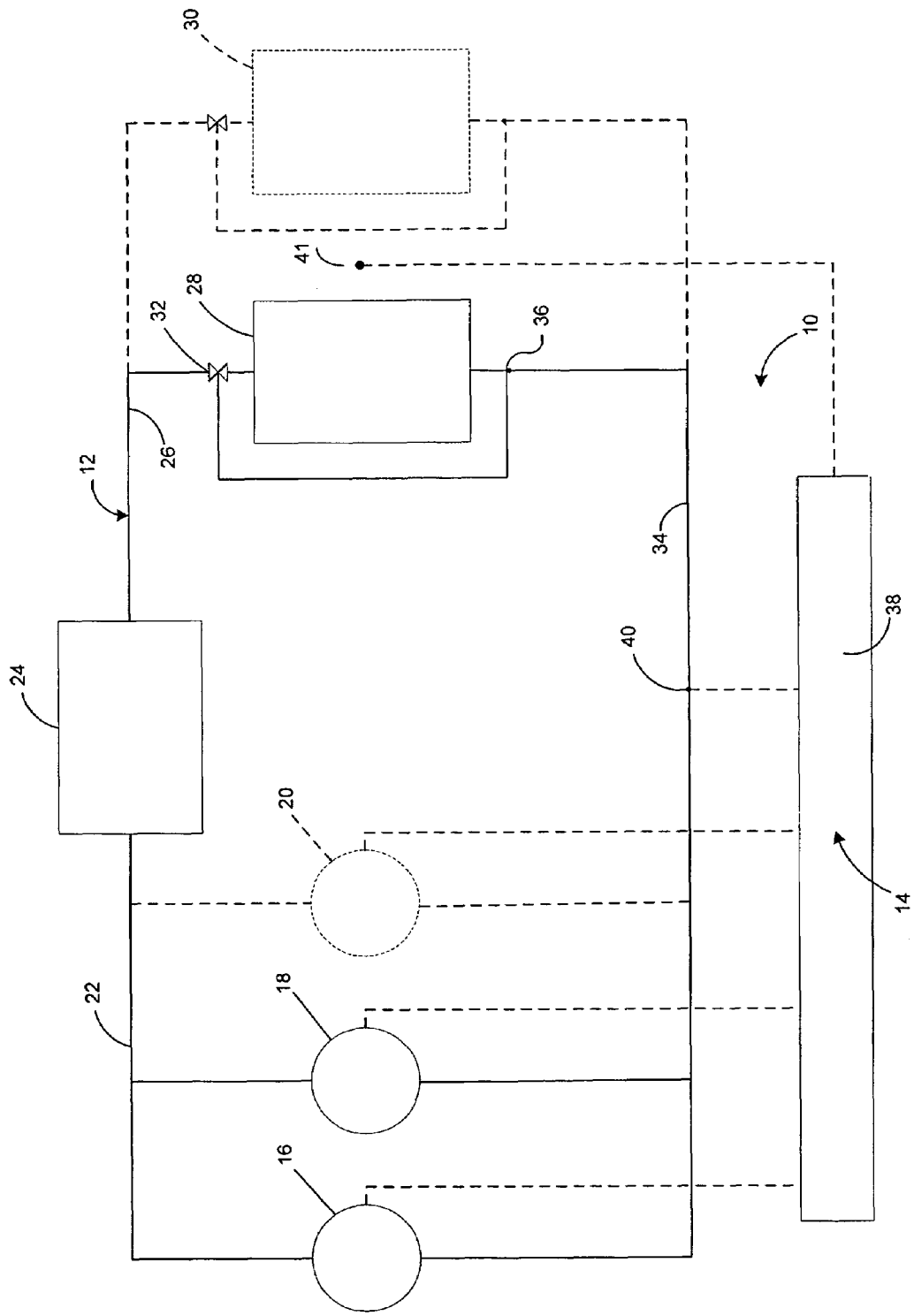
FIG. 1 is a schematic view of a refrigeration system embodying the present invention

FIG. 1 illustrates a refrigeration system 10 for cooling a refrigerated space such as, for example, a product display area of a refrigerated merchandiser. The refrigeration system 10 includes a refrigeration circuit 12 and a control system 14. The refrigeration circuit 12 includes a plurality of variable capacity compressors 16, 18, 20 arranged in parallel to compress a gaseous refrigerant and direct the compressed refrigerant via a discharge line 22 to a condenser 24 where the refrigerant is cooled. Although not shown, the condensed liquid can be delivered to a receiver vessel. Although two variable capacity compressors 16, 18 are shown in solid lines, any number of variable capacity compressors can also be used as represented by the compressor 20 in phantom lines. Any type of variable capacity compressor can be used such as a variable piston stroke or variable speed compressor.

The condensed liquid refrigerant is routed from the condenser 24 via a liquid line 26 to the evaporator 28. Prior to reaching the evaporator 28, the liquid refrigerant is forced through an expansion valve 32, where the liquid refrigerant encounters low pressure, boils, and evaporates thereby converting the liquid refrigerant into a two-phase fluid. The two-phase refrigerant absorbs heat from air being directed through the evaporator 28 by a fan (not shown). The refrigerant generally leaves the evaporator 28 in a superheated condition and is routed back via a suction line 34 to the compressors 16, 18, 20 for recycling. The expansion valve 32 is a mechanical expansion valve responding to the temperature in the suction line 34 as sensed by a bulb 36 or other temperature sensing device. In other embodiments, the expansion valve 32 can be an electronic expansion valve. The cooled air exiting the evaporator 28 is introduced into the refrigerated space at a discharge air temperature where, in the case of the product display area, the cooled air will remove heat from the displayed food products and maintain the food products within a desired predetermined temperature range. After being circulated through the product display area, the warmed air is routed back to be circulated again through the evaporator 28 by the fan. The evaporator 28 defines a load of the refrigeration circuit 12 while operating to refrigerate the space within the predetermined temperature range.

In the illustrated embodiment, a single evaporator 28 is shown in solid lines within a single space. In other embodiments, more than one evaporator connected to the refrigeration circuit 12 in series, in parallel, or any combination of both could be used to cool the space. In yet other embodiments, additional spaces can be added including additional evaporators that can be connected to the same refrigeration circuit 12 in series, in parallel, or any combination of both. The additional evaporators are represented by the evaporator 30 in phantom lines. The load of the refrigeration circuit is defined by all of the evaporators operating in the refrigeration circuit 12.

As used in the specification and the claims, the capacity of the plurality of compressors 16, 18, 20 is said to "match" the load when the plurality of compressors 16, 18, 20 operate at a capacity sufficient to meet the cooling requirements of the load. Matching the cooling requirements of the load may be measured by specific operating parameters such as suction pressure or discharge air temperature. The capacity of the compressors matches the load when, as discussed in detail below, the suction pressure is within a specified range. In addition, the capacity of the plurality of compressors 16, 18, 20 is "lower" than the load when the capacity of the plurality of compressors 16, 18, 20 is insufficient to meet the cooling requirements of the load. Conversely, the capacity of the plurality of compressors 16, 18, 20 is said to be "higher" than the load when the capacity of the plurality of compressors 16, 18, 20 exceeds the cooling requirements of the load.

As mentioned above, the pressure within the suction line 34 (i.e., suction pressure Ps) is one possible indicator to determine where the capacity of the plurality of variable capacity compressors 16, 18, 20 measures relative to the load. The capacity of the plurality of variable capacity compressors 16, 18, 20 falls within a predetermined operating range Pset when the capacity of the plurality of compressors 16, 18, 20 matches the load. The suction pressure Ps is above the predetermined operating range Pset when the capacity of the plurality of compressors 16, 18, 20 is lower than the load. The suction pressure Ps is below the predetermined operating range Pset when the capacity of the plurality of compressors 16, 18, 20 is higher than the load.

In addition, the temperature of the air exiting the evaporator 28 is another possible indicator to determine where the capacity of the plurality of variable capacity compressors 16, 18, 20 measures relative to the load. The capacity of the plurality of variable capacity compressors 16, 18, 20 falls within a predetermined temperature operating range when the capacity of the plurality of compressors 16, 18, 20 matches the load. The discharge air temperature is above the predetermined operating range when the capacity of the plurality of compressors 16, 18, 20 is lower than the load. The discharge air temperature is below the predetermined operating range when the capacity of the plurality of compressors 16, 18, 20 is higher than the load. Although suction pressure Ps is used to describe the illustrated embodiment, the discharge air temperature could also be used to control the capacity of the compressors 16, 18, 20.

The control system 14 includes a controller 38 and a pressure sensor 40 and a temperature sensor 41. The pressure sensor 40 is coupled to the suction line 34 and operable to measure the suction pressure Ps and create a pressure signal indicative of the suction pressure Ps. The temperature sensor 41 is positioned downstream of the airflow through the evaporator 28 and operable to measure the discharge air temperature and create a temperature signal indicative of the discharge air temperature. The controller 38 is in electrical communication with the pressure sensor 40 and is programmed to receive the pressure signal and determine the suction pressure Ps of the refrigeration circuit 12. Likewise, the controller 38 may be in electrical communication with the temperature sensor 41 and is programmed to receive the temperature signal and determine the discharge air temperature.

The controller 38 is also electrically coupled to each of the plurality of variable capacity compressors 16, 18, 20. The controller 38 is programmed to turn on, turn off, and adjust (i.e., raise or lower) the percent capacity of maximum for each compressor 16, 18, 20 independently of the other compressors. In addition, the controller 38 is programmed to determine the operating condition of each of the compressors 16, 18, 20 including whether the compressor 16, 18, 20 is operating (running) or not-operating (shut down), and if running, the percentage of maximum capacity at which the compressor 16, 18, 20 is running and the length of time the compressor 16, 18, 20 has been running. Likewise, if shut down, the controller 38 is programmed to be able to determine the length of time the compressor 16, 18, 20 has been shut down.

The controller also creates a queue of running compressors where the first-started running compressor is assigned to be the first compressor in the queue and the last-started running compressor is assigned to be the last compressor in the queue. Any compressors started between the first and last compressors in the queue are assigned a corresponding number in the queue assigned in the order the compressor was started. Likewise, the controller also creates a queue of non-running compressors where the first-stopped non-running compressor (i.e., the least-recently stopped non-running compressor) is the first compressor in the queue of non-running compressors and the last-stopped running compressor (i.e., the most-recently stopped non-running compressor) is assigned to be the last compressor in the queue of non-running compressors. Any compressor stopped between the first and last compressors in the non-running queue are assigned a corresponding number in the queue of non-running compressors assigned in the order the compressor was stopped.

When the first compressor in the queue of running compressors is shut-down, the controller removes it from the queue of running compressors, indexes or advances the remaining compressors in the queue of running compressors, and adds it to the end of the queue of non-running compressors. Similarly, when a first compressor in the queue of non-running compressors is started, the controller removes it from the queue of non-running compressors, indexes or advances the remaining compressors in the queue of non-running compressors, and adds it to the end of the queue of running compressors. In other words, when the first compressor is removed from the beginning of one queue by being started or stopped, it is then added to the end of the other queue. It should be noted that position in either queue is completely independent of the relative physical positions of the compressors.

Fluctuations in the load occur for many reasons including, but not limited to, fluctuations in the temperature of the environment surrounding the refrigerated space, the frequency of communication between the refrigerated space and the environment, for example due to opening and closing of a door to gain access to the space, frost build-up on the evaporators 28, 30, defrost of evaporators 28, 30, introduction of elevated-temperature products within the refrigerated space, and blockage of cooling air passageways. It is advantageous to adjust the capacity of the plurality of variable capacity compressors 16, 18, 20 to match the load for improved temperature control and efficiency of the refrigeration system 10.

A control method for adjusting the capacity of the plurality of variable capacity compressors 16, 18, 20 is described below with reference to FIGS. 2a-2c. The illustrated control method starts and stops compressors 16, 18, 20 and increases and decreases compressor capacities to match the cooling requirements of the load, such that over time, compressor loading and run times will be approximately equal. In addition, the control method improves energy efficiency and reduces overall compressor run time because it substitutes two compressors at part load with one compressor at near full load.

Figure 2A:
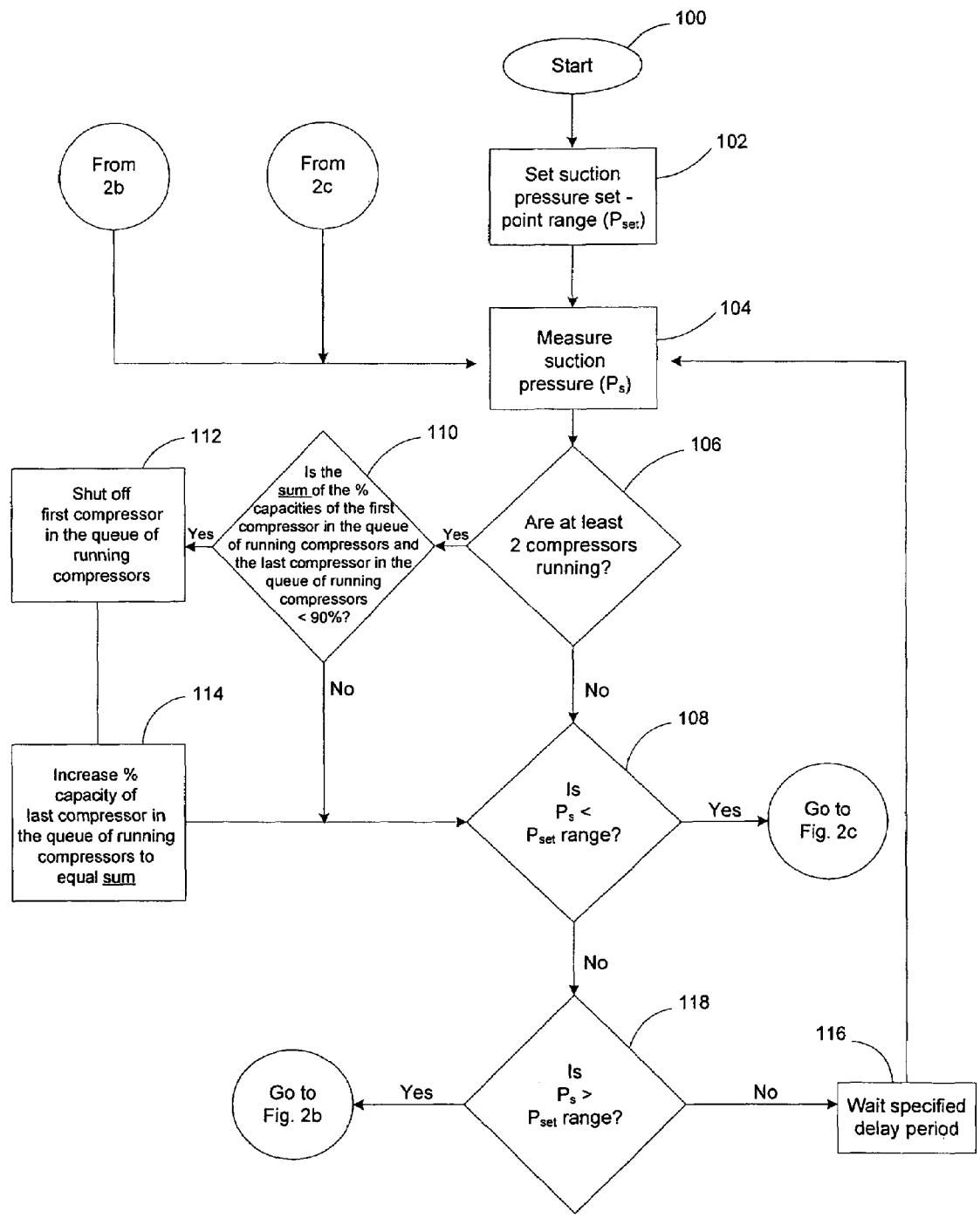
FIG. 2a is a flow chart of the operation of a control system for the refrigeration system shown in FIG. 1.

With reference to FIG. 2a, action 100 represents the startup or beginning of the operation of the control method and refrigeration system 10. At action 102 the desired predetermined suction pressure setpoint range Pset is set. As mentioned previously, the discharge air temperature can be used instead or in addition to the suction pressure Ps to control compressor capacity. The setpoint range Pset can be input by an operator through a keyboard, key pad, dial, or other manually usable input means. The setpoint range is stored and accessible by the controller 38. Next, in action 104 the controller receives the signal from the pressure sensor 40 to determine the suction pressure Ps. The measured suction pressure Ps is stored and accessible by the controller 38.

Next, the controller 38 determines in action 106 whether at least two of the compressors 16, 18, 20 are running. Initially, at startup none of the compressors 16, 18, 20 are running. In this case, where one or no compressors 16, 18, 20 are running, the control method advances to action 108. Alternatively, if two or more compressors 16, 18, 20 are running the control method advances to action 110.

In action 110, the control method determines the percentage of maximum capacity of each of the first and last compressors in the queue of running compressors. Once these are determined, the controller 38 calculates the sum of the percent capacities of the first and last compressors in the queue and determines whether that sum is less than or equal to ninety. Although the predetermined programmed level is ninety in the illustrated embodiment, other levels could be used such as one-hundred, ninety-five, eighty-five, eighty, or seventy-five or any other level that would provide a more efficient system by running a single compressor at the level rather than two compressors, when combined, run at the level.

Although not specifically shown, the programmed level can be entered by a user in a typical manner such as the suction pressure set point range Pset described above. If the controller 38 determines that the sum is greater than ninety the controller 38 moves to action 108. Alternatively, if the control determines that the sum is less than ninety, the controller 38 moves to action 112, which turns off the first compressor in the queue. After turning off the first compressor in the queue, the controller 38 moves to action 114 and increases the percent capacity of the last compressor in the queue equal to the sum calculated in action 110. From action 114 the controller 38 moves to action 108. After the capacity of the last compressor in the queue is increased, the controller 38 indexes or advances the queue and adds the recently turned-off compressor to the end of the queue of non-running compressors.

In action 108, the controller 38 determines whether the measured and stored suction pressure Ps is less than the predetermined and stored suction pressure range Pset. If the controller 38 determines that the suction pressure Ps is lower than the setpoint range Pset (i.e., the capacity of the running compressors is higher than the load), then the controller 38 will proceed to decrease the capacity of the plurality of compressors by moving to action 122 shown on FIG. 2c. Alternatively, if the suction pressure Ps is not less than the setpoint range Pset, then the controller moves to action 118 where the controller 38 will determine whether the suction pressure Ps is above the setpoint range Pset.

Figure 2B:
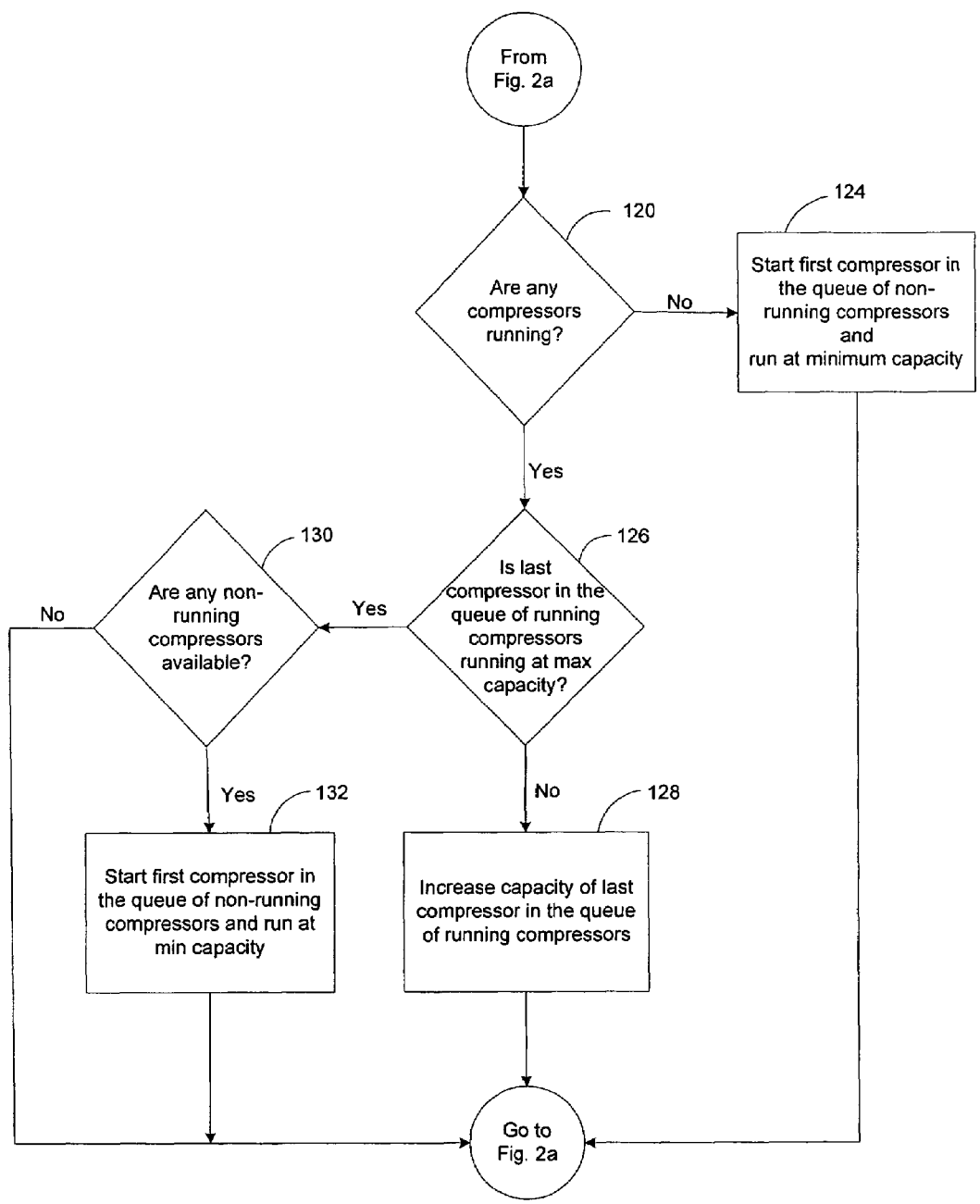
FIG. 2b is a flow chart of the operation of the control system of FIG. 2a, illustrating an increase to compressor capacity.
Figure 2C:
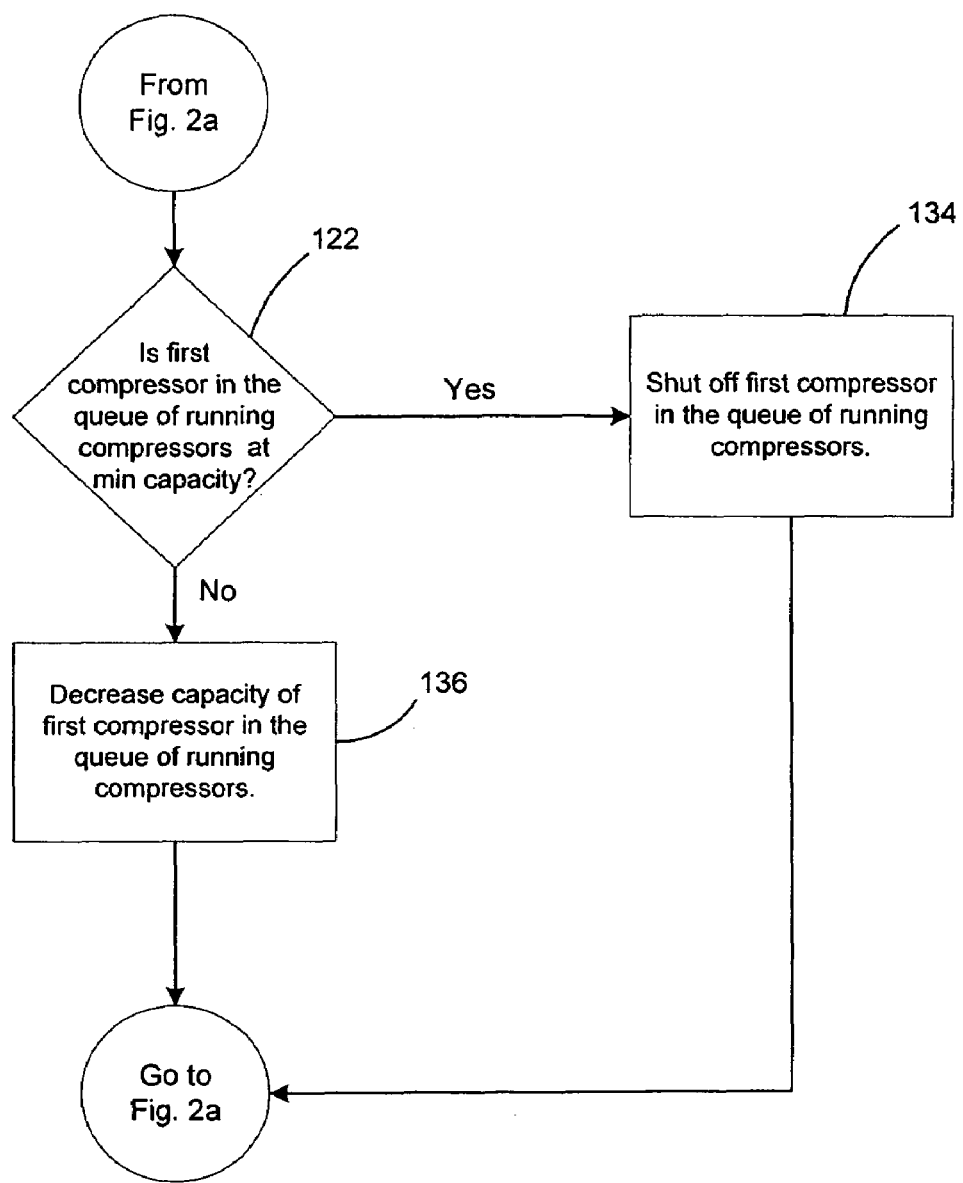
FIG. 2c is a flow chart of the operation of the control system of FIG. 2a, illustrating a decrease to the compressor capacity.

If the suction pressure Ps is above the setpoint range Pset (i.e., the capacity of the running compressors is lower than the load), then the controller 38 will proceed to increase the capacity of the plurality of compressors by moving to action 120 shown on FIG. 2b. Alternatively, if the suction pressure Ps is not above (or below as determined in action 108) the setpoint range Pset, then the controller determines that the suction pressure Ps is within the setpoint range Pset and moves to action 116 where, after a delay, the control moves back to action 104.

The control method for increasing the capacity of the compressors 16, 18, 20 is described below with reference to FIG. 2b. Action 120 determines whether any compressors 16, 18, 20 are running. If no compressors 16, 18, 20 are running, such as at startup, the controller 38 moves to action 124, which starts the first compressor in the queue of non-running compressors (i.e., the first-stopped non-running compressor or, in other words, the compressor that has been stopped the longest) and runs the compressor at minimum capacity. After the compressor is started, the controller removes it from the queue of non-running compressors, indexes or advances the queue of non-running compressors, and adds it to the end of the queue of running compressors. Then, the controller 38 moves back to action 104 in FIG. 2a. If at least one compressor 16, 18, 20 is running, the controller 38 moves to action 126, which determines whether the last compressor in the queue of running compressors (i.e., the last-started running compressor or the compressor that was started most recently and remains running) is running at maximum capacity. If the compressor is not running at maximum capacity, then the controller 38 moves to action 128 and increases the capacity of the last compressor in the queue of running compressors by a predetermined increment. The predetermined increment can be based on a percentage of maximum, such as ten percent increments. After the capacity of the last compressor in the queue of running compressors is increased, the controller 38 moves back to action 104 in FIG. 2a.

Referring back to action 126, if the last compressor in the queue of running compressors is running at maximum capacity (i.e., 100% capacity), then the controller 38 moves to action 130, which determines whether any non-running compressors are still available in the refrigeration circuit 12. If a non-running compressor is available (i.e., if there are any compressors in the queue of non-running compressors), the controller 38 moves to action 132 and starts the first compressor in the queue of non-running compressors (i.e., the non-running compressor that has been shut down the longest) and runs the compressor at minimum capacity. After the compressor is started, the controller removes it from the queue of non-running compressors, indexes or advances the queue of non-running compressors, and adds it to the end of the queue of running compressors. After action 132, the controller 38 moves back to action 104 in FIG. 2a. Likewise, the controller 38 moves back to action 104 in FIG. 2a if the controller 38 decides in action 130 that no more non-running compressors are available. In this case, all of the compressors would be running at maximum capacity.

The control method for decreasing the capacity of the compressors 16, 18, 20 is described with reference to FIG. 2c. Action 122 determines whether the first compressor in the queue of running compressors is running at minimum capacity. If the compressor is running at minimum capacity, the controller moves to action 134 and turns off the first compressor in the queue of running compressors. After the compressor is turned off, the controller removes it from the queue of running compressors, indexes or advances the queue of running compressors, and adds it to the end of the queue of non-running compressors. Then, the controller 38 moves back to action 104 in FIG. 2a. If the first-started compressor is not running at minimum capacity, then the controller moves to action 136 and decreases the capacity of the first-started running compressor by a predetermined increment. After the capacity is decreased in action 136, the controller 38 moves back to action 104 in FIG. 2a.

The control method will continue to run to match the capacity of the plurality of variable capacity compressors 16, 18, 20 to the load by increasing the capacity of the last compressor in the queue of running compressors when the capacity of the plurality of variable capacity compressors 16, 18, 20 is lower than the load and decreasing the capacity of the first compressor in the queue of running compressors when the capacity of the plurality of variable capacity compressors 16, 18, 20 is higher than the load. In addition, the control method will continue to calculate a sum by adding the first and second percentages, comparing the sum with a predetermined level, and shutting off the first compressor in the queue of running compressors and increasing the capacity of the last compressor in the queue of running compressors when the sum of the percentages of the first and last compressors in the queue of running compressors is less than a predetermined level.

Thus, the invention provides, among other things, a control method that starts and stops compressors and increases and decreases compressor capacities to match the cooling requirements of a load, such that over time, compressor loading and run times will be approximately equal. In addition, the control method improves energy efficiency and reduces overall compressor run time because it substitutes two compressors at part load with one compressor at near full load. A consequence of the method described in this embodiment is that only the first and last compressors in the queue of running compressors run partially loaded, while all other intermediate compressors in the queue of running compressors run fully loaded. Various features and advantages of the invention are set forth in the following claims.

What is claimed is:

1. A refrigeration system for cooling a space using a refrigerant, the refrigeration system comprising:
a refrigeration circuit including
a plurality of variable capacity compressors arranged in parallel, the plurality of variable capacity compressors operable to compress the refrigerant, wherein one of the plurality of variable capacity compressors is a first variable capacity compressor started to define a first compressor in a queue of running compressors, and wherein another of the plurality of variable capacity compressors is a second variable capacity compressor started after the first compressor in the queue to define a last compressor in the queue,
a condenser in fluid communication with the plurality of variable capacity compressors, the condenser operable to receive compressed refrigerant from the plurality of variable capacity compressors and to condense the refrigerant, and
at least one evaporator in fluid communication between the condenser and the plurality of variable capacity compressors, the at least one evaporator operable to receive condensed refrigerant from the condenser, to evaporate the refrigerant to refrigerate the space within a predetermined temperature range, and deliver the evaporated refrigerant to the plurality of variable capacity compressors, wherein the at least one evaporator defines a load while operating to refrigerate the space within the predetermined temperature range; and
a controller programmed to control the operation of the plurality of variable capacity compressors to match the capacity of the plurality of variable capacity compressors to the load when the first compressor and the last compressor are each running below maximum capacity and above minimum capacity by increasing the capacity of the last compressor in the queue and not increasing the capacity of the first compressor in the queue when the capacity of the plurality of variable capacity compressors is lower than the load and by decreasing the capacity of the first compressor in the queue and not decreasing the capacity of the last compressor in the queue when the capacity of the plurality of variable capacity compressors is higher than the load.

2. The refrigeration system of claim 1, wherein the first compressor in the queue is a first-started running variable capacity compressor.

3. The refrigeration system of claim 1, wherein the last compressor in the queue is a last-started running variable capacity compressor.

4. The refrigeration system of claim 1, wherein the first compressor in the queue is running at a first percentage of maximum capacity and the second compressor in the queue is running at a second percentage of maximum capacity, and wherein the controller is programmed to shut off the first compressor in the queue and increase the capacity of the second compressor in the queue when the sum of the first and second percentages is less than a predetermined level.

5. The refrigeration system of claim 4, wherein the controller is programmed to increase the capacity of the second compressor in the queue to match the combined sum of the first and second percentages when the sum of the first and second percentages is less than the predetermined level.

6. The refrigeration system of claim 1, wherein the controller is programmed to start a third of the plurality of variable capacity compressors after starting the first and second compressors in the queue when the last compressor in the queue is running at maximum capacity and when the capacity of the plurality of variable capacity compressors is lower than the load.

7. The refrigeration system of claim 6, wherein the third variable capacity compressor is a first compressor in a queue of non-running compressors.

8. The refrigeration system of claim 1, wherein the controller is programmed to shut off the first compressor in the queue when the first compressor in the queue is running at minimum capacity and the capacity of the plurality of variable capacity compressors is higher than the load.

9. The refrigeration system of claim 1, wherein the at least one evaporator is fluidly coupled to the plurality of variable capacity compressors with a suction line, wherein the refrigeration system further comprises a pressure sensor coupled to the suction line, and wherein the pressure sensor is operable to create a pressure signal indicative of the suction pressure of the refrigerant in the suction line, and wherein the controller is programmed to receive the pressure signal and determine the load based on the signal.

10. A refrigeration system for cooling a space using a refrigerant, the refrigeration system comprising:
a refrigeration circuit including
a plurality of variable capacity compressors arranged in parallel, the plurality of variable capacity compressors operable to compress the refrigerant, wherein one of the plurality of variable capacity compressors is a first variable capacity compressor running at a first percentage of maximum capacity, the first variable capacity compressor defining a first compressor in a queue of running compressors, and wherein another of the plurality of variable capacity compressors is a second variable capacity compressor started after the first compressor in the queue and running at a second percentage of maximum capacity, the second variable capacity compressor defining a last compressor in the queue,
a condenser in fluid communication with the plurality of variable capacity compressors, the condenser operable to receive compressed refrigerant from the plurality of variable capacity compressors and to condense the refrigerant, and
at least one evaporator in fluid communication between the condenser and the plurality of variable capacity compressors, the at least one evaporator operable to receive condensed refrigerant from the condenser, to evaporate the refrigerant to refrigerate the space within a predetermined temperature range, and deliver the evaporated refrigerant to the plurality of variable capacity compressors, wherein the at least one evaporator defines a load while operating to refrigerate the space within the predetermined temperature range; and
a controller programmed to control the operation of the plurality of variable capacity compressors to match the capacity of the plurality of variable capacity compressors to the load, the controller programmed to shut off the first compressor in the queue and increase the capacity of the last compressor in the queue by the first percentage of maximum capacity when the sum of the first and second percentages is less than a predetermined level.

11. The refrigeration system of claim 10, wherein the first compressor in the queue is a first-started running variable capacity compressor.

12. The refrigeration system of claim 10, wherein the last compressor in the queue is a last-started running variable capacity compressor.

13. The refrigeration system of claim 10, wherein the controller is programmed to stop the first compressor in the queue and programmed to increase the capacity of the last compressor in the queue to match the combined sum of the first and second percentages when the sum of the first and second percentages is less than the predetermined level.

14. The refrigeration system of claim 10, wherein the controller is programmed to increase the capacity of the last compressor in the queue when the capacity of the plurality of variable capacity compressors is lower than the load and to decrease the capacity of the first compressor in the queue when the capacity of the plurality of variable capacity compressors is higher than the load.

15. The refrigeration system of claim 10, wherein the at least one evaporator is fluidly coupled to the plurality of variable capacity compressors with a suction line, wherein the refrigeration system further comprises a pressure sensor coupled to the suction line, and wherein the pressure sensor is operable to create a pressure signal indicative of the suction pressure of the refrigerant in the suction line, and wherein the controller is programmed to receive the pressure signal and determine the load based on the signal.

16. The refrigeration system of claim 10, wherein the predetermined level is approximately 90.

* * * * *

UNITED STATES PATENT AND TRADEMARK OFFICE
CERTIFICATE OF CORRECTION

PATENT NO. : 7,617,695 B2  Page 1 of 1
APPLICATION NO. : 11/392323
DATED : November 17, 2009
INVENTOR(S) : Doron Shapiro It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 709 days.

Signed and Sealed this

Nineteenth Day of October, 2010

David J. Kappos
*Director of the United States Patent and Trademark Office*